(12) United States Patent
Drexler et al.

(10) Patent No.: US 10,431,123 B2
(45) Date of Patent: Oct. 1, 2019

(54) METHOD FOR TESTING AND HARDENING SOFTWARE APPLICATIONS

(71) Applicant: GIESECKE & DEVRIENT GMBH, München (DE)

(72) Inventors: Hermann Drexler, München (DE); Sven Bauer, Vaterstetten (DE)

(73) Assignee: GIESECKE+DEVRIENT MOBILE SECURITY GMBH, München (DE)

( * ) Notice: Subject to any disclaimer, the term of this patent is extended or adjusted under 35 U.S.C. 154(b) by 324 days.

(21) Appl. No.: 15/525,432

(22) PCT Filed: Nov. 9, 2015

(86) PCT No.: PCT/EP2015/002246
§ 371 (c)(1),
(2) Date: May 9, 2017

(87) PCT Pub. No.: WO2016/074782
PCT Pub. Date: May 19, 2016

(65) Prior Publication Data
US 2017/0324547 A1 Nov. 9, 2017

(30) Foreign Application Priority Data
Nov. 10, 2014 (DE) .................. 10 2014 016 548

(51) Int. Cl.
*H04L 9/06* (2006.01)
*G09C 1/06* (2006.01)
(Continued)

(52) U.S. Cl.
CPC ............ *G09C 1/06* (2013.01); *G06F 9/4403* (2013.01); *G06F 21/12* (2013.01); *G09C 1/00* (2013.01);
(Continued)

(58) Field of Classification Search
CPC . H04L 9/0618; H04L 9/002; H04L 2209/043; G06C 21/12; G06C 1/00
(Continued)

(56) References Cited

U.S. PATENT DOCUMENTS

2004/0139340 A1 7/2004 Johnson et al.
2009/0158051 A1* 6/2009 Michiels ................. H04L 9/002
713/189

(Continued)

OTHER PUBLICATIONS

"BSI: Minimum Requirements for Evaluating Side-Channel Attack Resistance of RSA, DSA and Diffie-Hellman Key Exchange Implementations," Part of AIS 46, pp. 91, URL: https://www.bs.bund.de/SharedDocs/Downloads/DE/BSI/Zertifizierung/Interpretationen /AIS_46_BSI_guidelines_SCA_RSA_V1_0_e_pdf.pdf.
(Continued)

*Primary Examiner* — Evans Desrosiers
(74) *Attorney, Agent, or Firm* — Workman Nydegger

(57) ABSTRACT

Methods are provided for testing and hardening software applications for the carrying out digital transactions which comprise a white-box implementation of a cryptographic algorithm. The method comprises the following steps: (a) feeding one plaintext of a plurality of plaintexts to the white-box implementation; (b) reading out and storing the contents of the at least one register of the processor stepwise while processing the machine commands of the white-box implementation stepwise; (c) repeating the steps (a) and (b) with a further plaintext of the plurality of plaintexts N-times; and (d) statistically evaluating the contents of the registers and the plaintexts, the intermediate results and/or the ciphertexts generated from the plaintexts by searching for correlations between the contents of the registers and the plaintexts, the intermediate results and/or the ciphertexts generated from the plaintexts to establish the secret key.

7 Claims, 3 Drawing Sheets

(51) Int. Cl.
  *G09C 1/00* (2006.01)
  *H04L 9/00* (2006.01)
  *G06F 9/4401* (2018.01)
  *G06F 21/12* (2013.01)
  *H04L 9/08* (2006.01)

(52) U.S. Cl.
  CPC ............ *H04L 9/002* (2013.01); *H04L 9/0618* (2013.01); *H04L 9/0625* (2013.01); *H04L 9/0631* (2013.01); *H04L 9/0822* (2013.01); *H04L 2209/043* (2013.01); *H04L 2209/08* (2013.01); *H04L 2209/16* (2013.01)

(58) Field of Classification Search
  USPC .......................................................... 380/42
  See application file for complete search history.

(56) References Cited

U.S. PATENT DOCUMENTS

| | | | |
  |---|---|---|---|
  | 2011/0067012 A1* | 3/2011 | Eisen ..................... | G06F 8/51 717/140 |
  | 2012/0002807 A1* | 1/2012 | Michiels ................. | H04L 9/002 380/28 |
  | 2013/0016836 A1 | 1/2013 | Farrugia et al. | |
  | 2017/0324542 A1* | 11/2017 | Drexler .................... | G09C 1/00 |

OTHER PUBLICATIONS

Chow et al., "White-Box Cryptography and an AES Implementation," SAC '02 Revised Papers from the 9th Annual International Workshop on Selected Areas in Cryptography, Aug. 15-16, 2002, pp. 1-18.

Chow et al., "A White-Box DES Implementation for DRM Applications," 2002 ACM Workshop on Digital Rights Management, Nov. 18, 2002, pp. 1-16, URL: https://crypto.stanford.edu/DRM2002/whitebox.pdf.

German Search Report for corresponding German Application No. 102014016548.5, dated Mar. 9, 2017.

Herbst et al., "An AES Smart Card Implementation Resistant to Power Analysis Attacks," Applied Cryptography and Network Security Lecture Notes in Computer Science, Jan. 1, 2006, pp. 239-252.

International Search Report for corresponding International PCT Application No. PCT/EP2015/002246, dated Feb. 19, 2016.

Kocher et al., "Differential Power Analysis," Cryptography Research, Inc., 1999, pp. 1-10.

Link et al., "Clarifying Obfuscation: Improving the Security of White-Box Encoding," International Association for Cryptologic Research, Jan. 30, 2004, pp. 1-11, vol. 20040202:165204.

Muir et al., "A Tutorial on White-Box AES," Cryptology ePrint Archive, 2013, pp. 1-25, URL: http://eprint.iacr.org/2013/104.

* cited by examiner

US 10,431,123 B2

METHOD FOR TESTING AND HARDENING SOFTWARE APPLICATIONS

FIELD OF THE INVENTION

The invention relates in general to the technical field of protecting software applications against attacks. In particular, the invention relates to methods, on the one hand for testing, and on the other hand for hardening software applications for carrying out digital transactions which comprise a white-box implementation of a cryptographic algorithm.

BACKGROUND OF THE INVENTION

Mobile end devices in the form of smartphones are increasingly being used to carry out digital transactions, for example for cashless payments at a NFC terminal or for the purchase of goods or services from an online retailer. When carrying out such a digital transaction, as a rule a software application implemented on the smartphone (briefly called "app") interacts with a terminal or server. For this, a cryptographic algorithm, e.g. an encryption algorithm, is frequently part of the software application implemented on the mobile end device, with said software application accessing security-critical data, e.g. PINs, passwords, keys etc. In the past, security-critical data has as a rule been deposited on a stand-alone security element of the mobile end device, frequently in the form of a SIM card removable from the mobile end device, to protect it from an attack by an unauthorized person.

A newer approach, which can be employed advantageously in particular when carrying out digital transactions with a mobile end device which has no stand-alone security element for securely storing security-critical data, is based on the so-called white box cryptography. What is attempted in a white-box implementation of a cryptographic algorithm is to hide the security-critical data, in particular secret cryptographic keys, in the implementation such that an attacker who has full access to the implementation is unable to extract the security-critical data therefrom. A white-box implementation of the AES crypto-algorithm ("Advanced Encryption Standard") is known, for example, from the publication "A Tutorial on White-box AES" by James A. Muir, Cryptology ePrint Archive, Report 2013/104. Likewise, white-box implementations of cryptographic algorithms or routines are distributed commercially.

It is an object of the invention to provide methods, on the one hand for testing, and on the other hand for hardening software applications for carrying out digital transactions which comprise a white-box implementation of a cryptographic algorithm.

SUMMARY OF THE INVENTION

The hereinabove objects are achieved according to the present invention by the respective subject matters of the independent claims. Preferred embodiments of the invention are defined in the dependent claims.

Surprisingly, the examinations of the inventors have shown that for commercially available white-box implementations of cryptographic algorithms or routines, the secret key can be derived, namely by means of the following method according to the first aspect of the invention.

According to a first aspect of the invention, a method is provided for testing a white-box implementation of a cryptographic algorithm, said implementation being executable on a processor, which generates a ciphertext from a plaintext by means of a secret key, and is present in the processor in the form of machine commands, wherein the processor comprises at least one register. The method comprises the following steps: (a) feeding one plaintext of a plurality of plaintexts to the white-box implementation; (b) reading out and storing the contents of the at least one register of the processor stepwise while processing the machine commands of the white-box implementation stepwise, wherein intermediate results can be generated while processing the machine commands of the white-box implementation stepwise; (c) repeating the steps (a) and (b) with a further plaintext of the plurality of plaintexts N-times; and (d) statistically evaluating the contents of the registers and the plaintexts, the intermediate results and/or the ciphertexts generated from the plaintexts by searching for correlations between the contents of the registers and the plaintexts, the intermediate results and/or the ciphertexts generated from the plaintexts to establish the secret key.

Preferably, the content of a register for a plaintext is treated as a function of the number of the processed machine commands analogously to a power/current curve in differential power analysis.

According to preferred embodiments of the invention, the white-box implementation is part of a software application for carrying out a digital transaction.

Preferably, the step (d) of statistically evaluating the contents of the registers and the plaintexts, the intermediate results and/or the ciphertexts generated from the plaintexts comprises the evaluation by means of statistical methods which are known from differential power analysis.

According to preferred embodiments of the invention, N is chosen so large that a static evaluating of the contents of the registers and the plaintexts, the intermediate results and/or the ciphertexts generated from the plaintexts is possible. Preferably the steps (a) and (b) are carried out with at least 10, 100 or 1000 different plaintexts.

Preferably, in the step (b) the readout of the content of the at least one register is carried out only as of a machine command predefined in the white-box implementation.

According to preferred embodiments of the invention, in the step (b) the readout of the content of the at least one register is carried out as of the predefined machine command for a predefined number M of machine commands.

Preferably, the white-box implementation of a cryptographic algorithm is a white-box implementation of the AES algorithm.

According to preferred embodiments of the invention, in the step (d) of statistically evaluating the contents of the registers and the plaintexts, the intermediate results and/or the ciphertexts generated from the plaintexts, those intermediate results and/or ciphertexts generated from the plaintexts are used that depend on only a few bits of the secret key.

According to a second aspect of the invention, a method for hardening a white-box implementation of a cryptographic algorithm is provided, said implementation being executable on a processor, which can generate a ciphertext from a plaintext using a cryptographic key. The white-box implementation is configured such that when generating the ciphertext at least one lookup table comes into use to statically map input values of the lookup table to output values of the lookup table. The method comprises the step that the lookup table is statistically permutated such that the individual bits of the permutated lookup table substantially do not correlate with the bits of the lookup table. In other words: the lookup table T will statistically be permutated by means of a permutation P such that the individual bits of the permutated lookup table T'(x)=P(T(x)) do not correlate with the bits T (x) for randomly varying input x.

Preferably the method comprises further the step of randomizing the white-box implementation. Here, "randomizing" will substantially be understood to mean that for each execution of the white-box implementation, an additional, varying chance is interspersed, preferably in the form of random numbers.

According to a third aspect of the invention, a further method for hardening a white-box implementation of a cryptographic algorithm is provided, said implementation being executable on a processor, which can generate a ciphertext from a plaintext using a cryptographic key. The white-box implementation is configured such that when generating the ciphertext at least one lookup table comes into use to statically map input values of the lookup table to output values of the lookup table. The method comprises the step of randomizing the white-box implementation. Here, "randomizing" will substantially be understood to mean that for each execution of the white-box implementation, an additional, varying chance is interspersed, preferably in the form of random numbers.

Preferably, the step of randomizing the white-box implementation according to the second or third aspect of the invention comprises the step of randomly scrambling the program run of the white-box implementation.

According to preferred embodiments of the invention, the step of randomizing the white-box implementation according to the second or third aspect of the invention comprises the step of incorporating functionally equivalent code variants from which one of the code variants can randomly be selected upon the execution of the white-box implementation.

Preferably, the step of randomizing the white-box implementation according to the second or third aspect of the invention comprises the step of randomly masking intermediate results, input data and/or output data.

According to preferred embodiments of the invention, the step of randomizing the white-box implementation according to the second or third aspect of the invention comprises the step of incorporating random changes which again fall out of the operations performed in the white-box implementation.

Preferably, the step of randomizing the white-box implementation according to the second or third aspect of the invention comprises the step of randomizing tabulated functions.

According to preferred embodiments of the invention, the step of randomizing the white-box implementation according to the second or third aspect of the invention comprises the step of replacing lookup tables used in the white-box implementation by several functionally equivalent variants of lookup tables, wherein one of the functionally equivalent variants of lookup tables can randomly be selected in each case when carrying out the white-box implementation. Preferably, the variants of lookup tables are statistically permutated such that the individual bits of the permutated lookup table substantially do not correlate with the bits of the original lookup table.

According to a fourth aspect of the invention, a white-box implementation of a cryptographic algorithm is provided which is able to generate a ciphertext from a plaintext using a cryptographic key, wherein the white-box implementation has been hardened by a method according to the second or third aspect of the invention.

BRIEF DESCRIPTION OF THE DRAWINGS

Further features, advantages and objects of the invention can be found in the following detailed description of several exemplary embodiments and alternative embodiments. Reference is made to the drawings, in which there are shown.

DETAILED DESCRIPTION OF VARIOUS EMBODIMENTS

Figure 1:
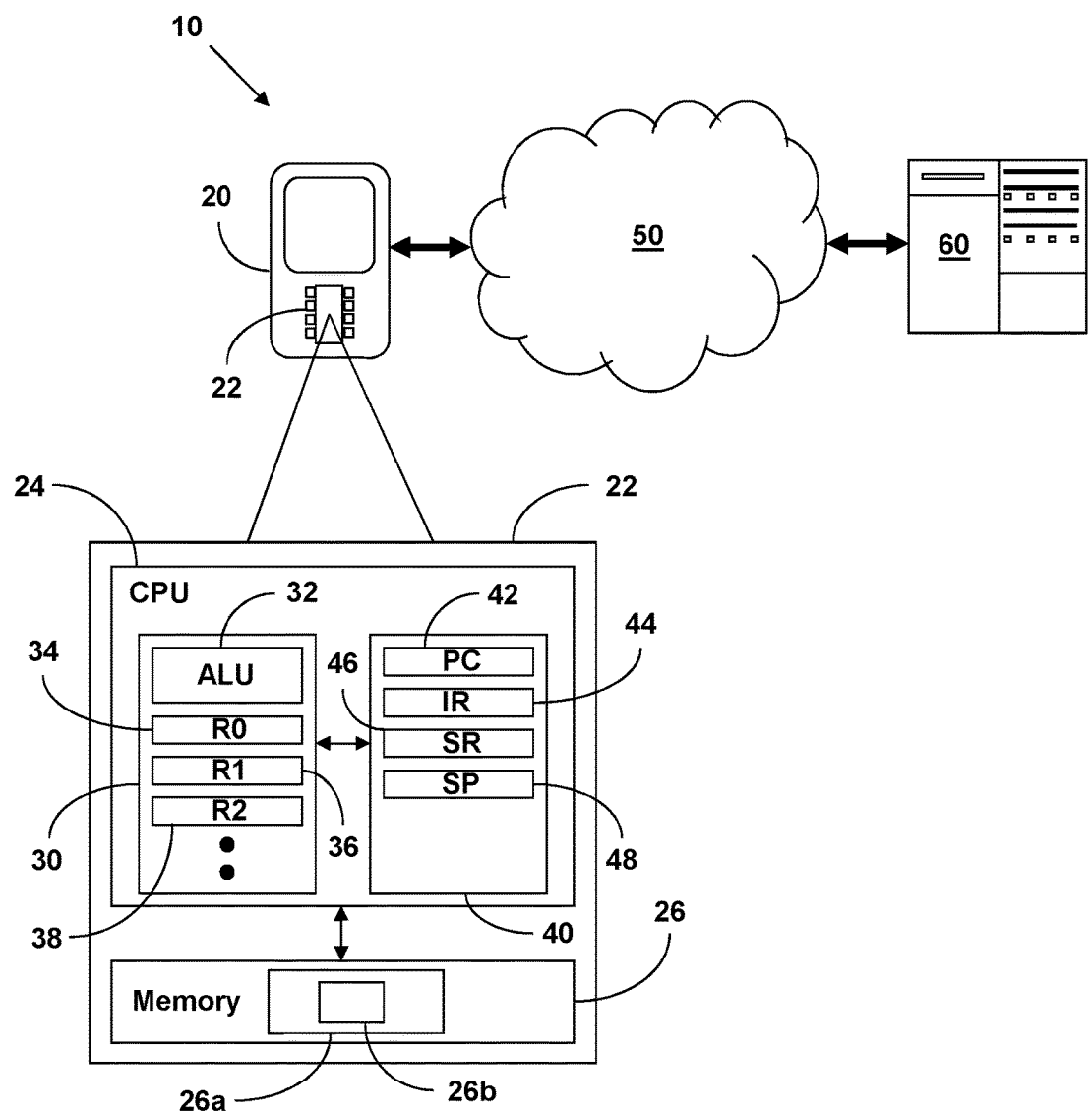
FIG. 1 a schematic representation of an exemplary communication system with a mobile end device in which the present invention comes into use advantageously, FIG. 2 a flowchart which shows the course of a method for testing a software application for carrying out digital transactions according to a preferred embodiment which comprises a white-box implementation of a cryptographic algorithm and is implemented on the mobile end device of FIG. 1, and FIG. 3 a flowchart which shows the course of a method for hardening a software application for carrying out digital transactions according to a preferred embodiment which comprises a white-box implementation of a cryptographic algorithm and is implemented on the mobile end device of FIG. 1.

FIG. 1 shows a schematic representation of an exemplary communication system 10 in which the invention can come into use advantageously. The communication system 10 comprises a computer unit 20 in the form of a mobile end device, preferably in the form of a smartphone. The mobile end device 20 is configured to communicate over a communication channel 50 with a server or a terminal 60. The communication channel 50 can, for example, be the Internet, a mobile radio network, an NFC channel or the like. The server 60 could be an NFC terminal of a service provider with whom a software application 26b can carry out transactions on the mobile end device 20, e.g. a payment transaction for which the software application processes a payment operation.

The mobile end device 20 has a chip 22 with a central processing unit (CPU), for example in the form of a microprocessor 24. As is known, the primary functions of the processor 24 are to execute arithmetic and logic functions and to read and write data elements, as is defined by a software application running on the processor 24 in the form of machine commands. For this purpose the processor 24 as represented in the embodiment in FIG. 1 comprises an arithmetic unit 30 as well as a control unit 40.

The arithmetic unit 30 of the processor 24 preferably consists substantially of an arithmetic logical unit (ALU) 32 as well as several working registers or data registers of which three registers are represented in FIG. 1 by way of example, namely the registers R0, R1 and R2, and marked with the reference signs 34, 36 and 38. As a rule, however, the arithmetic unit 30 will have more (as indicated by the points in FIG. 1) than the three registers R0, R1 and R2 represented in Figure, for example four, eight, sixteen or more registers. As is known, the arithmetic unit 30 is substantially configured to link data elements with each other by means of the ALU 32 according to the machine commands of software applications executed by the processor 24, and to store the results of such linkages for further processing, for example in the registers R0, R1 or R2. For this, at least one of the registers R0, R1 and R2 can, for example, serve as an accumulator for the ALU 32.

As is known, the control unit 40 of the processor 24 substantially serves to control the operation method of the arithmetic unit 30 and, where applicable, further components of the processor 24 on the basis of the successive processing of the machine commands of a software application running on the processor 24. For this, the control unit

40 of the processor 24 comprises several registers, namely preferably in particular a program counter (PC) 42, an instruction register (IR) 44, a status register (SR) 46 as well as a stack pointer (SP) 48.

As a rule, the program counter PC contains respectively the memory address of the next machine command to be executed of the software application running on the processor 24. The machine command currently to be executed is deposited in the command register IR. The status register SR is configured to receive feedback from the arithmetic unit 30 and the control unit 40 which can influence the address incrementation in the software application executed by the processor 24. The stack pointer SP 48 of the control unit 40 of the processor 24 serves for managing a memory stack (also called "stack"), which can be implemented in a memory unit 26 of the mobile end device 20. For this, the stack pointer SP 48 of the control unit 40 usually contains the memory address which defines the variable end of the memory stack in the storage unit 26.

The storage unit 26, which is in communication connection with the processor 24, preferably can comprise a volatile working memory (RAM), for example for receiving the machine commands of a software applications to be executed by the processor 24. Further, the storage unit 26 can comprise a non-volatile, preferably re-writable, memory to receive, for example in the unenergized state the machine commands of a software applications to be executed by the processor 24. Preferably the non-volatile, re-writable storage is a flash memory (flash EEPROM). It may be a flash memory with a NAND or a NOR architecture for example. The memory unit 26 can of course also comprise a read only memory (ROM).

FIG. 1 schematically represents that a software application 26a is deposited on the storage unit 26 for carrying out digital transaction of the mobile end device 10 with the server 60. According to the invention, the software application 26a comprises a white-box implementation of a cryptographic algorithm, for example a white-box implementation of the AES algorithm which in FIG. 1 is marked with the reference number 26b. The white-box implementation 26b is configured to generate a plaintext from a ciphertext by means of a cryptographic key which is concealed (i.e. secret) in the white-box implementation 26b.

Figure 2:
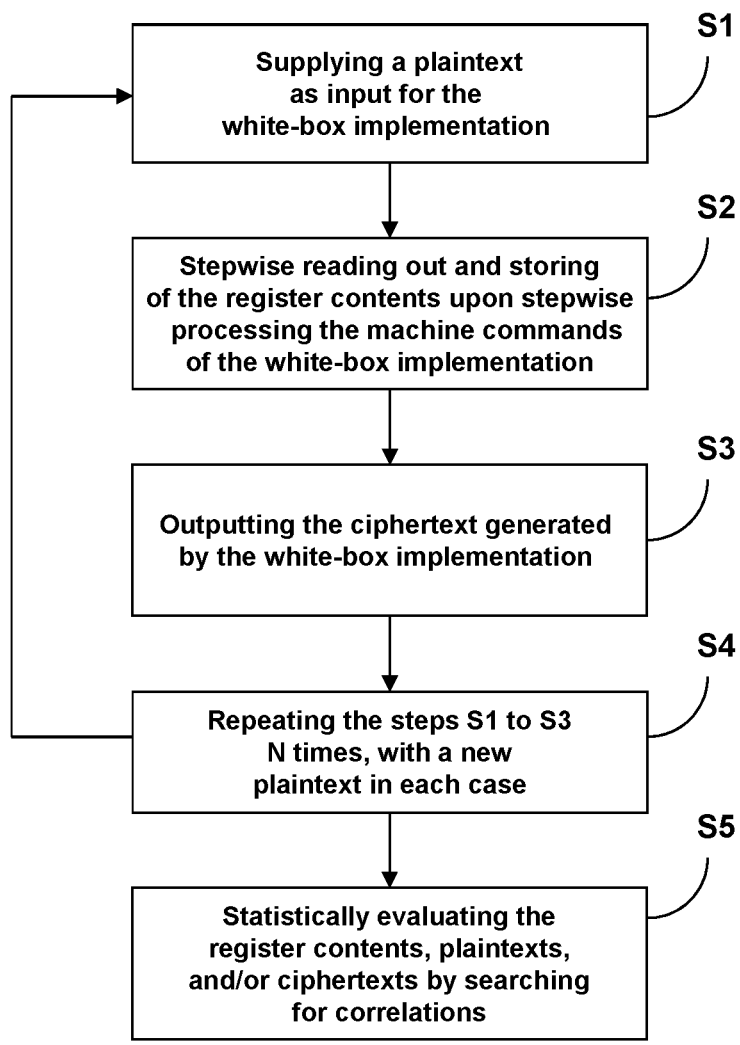

With further reference to FIG. 2, hereinafter a preferred embodiment of a method for testing the white-box implementation 26b of FIG. 1 is described.

In step S1 of FIG. 2, the white-box implementation 26b to be tested (or the software application 26a which comprises the white-box implementation 26b to be tested), a first known plaintext is provided as input to be encrypted by the white-box implementation 26b by means of the therein concealed secret key, i.e. to generate a corresponding ciphertext.

In step S2 of FIG. 2, while stepwise processing the machine commands, which are deposited on the storage unit 26 and which define the white-box implementation 26b (or the software application 26a which comprises the white-box implementation 26b to be tested), the contents of the registers R0, R1, R2, . . . of the processor 24 are stepwise read out and stored. Preferably all data registers of the processor 24 are read out. As is known to the skilled person, the reading out and storing of the register contents could be carried out, for example, by means of a debugger. Preferably the register contents are read out and stored for every step, i.e. after every command. While stepwise processing the machine commands for generating a ciphertext from the plaintext, one or several intermediate results can result.

In particular if the white-box implementation 26b of a cryptographic algorithm is part of an extensive software application 26a, it can be advantageous according to the invention that the stepwise reading out and storing of the register contents of the processor 24 is carried out only from a definable machine command in the software application 26a (comparably to a break point when debugging).

As already mentioned hereinabove, the final result of the stepwise processing of the machine commands of the white-box implementation 26b is a ciphertext corresponding to the plaintext inputted in step S1, said ciphertext being outputted in step S3 by the white-box implementation 26b. Preferably the ciphertext and/or the appurtenant plaintext are stored in connection with the register contents of the processor 24 already stored in step S2 after every processing of a machine command. Moreover, certain intermediate results calculated while computing the ciphertext can be stored.

According to the invention, the steps S1 to S3 of FIG. 2 are carried out for a plurality of plaintexts or are repeated (see step S4 of FIG. 2). Preferably the steps S1 to S3 of FIG. 2 are carried out or are repeated for more than 10, more than 100 or more than 1000 different plaintexts. As the skilled person will recognize, one thus obtains for every repetition of the steps S1 to S3 a respective data set which comprises the register contents of the processor 24 for the respective machine commands of the white-box implementation 26b, the inputted plaintext, selected intermediate results and the appurtenant ciphertext.

In step S5 of FIG. 2 the data sets obtained by means of the steps S1 to S4 are evaluated to obtain information items about the key used by the white-box implementation 26b for generating the ciphertexts from the respective plaintexts. According to the invention, statistical methods are applied for this purpose as are known from differential power analysis (DPA) which, as is known, are a form of side-channel attacks on chip cards. According to the invention, the statistical methods, which are known from differential power analysis of cryptographic algorithms implemented on chip cards, can be applied especially advantageously by the fact that the contents of a register of the processor as a function of the number of the already processed machine commands is treated like a power/current curve (course of the power/current as a function of the machine command or the time) in differential power analysis.

As is known to the skilled person, in differential power analysis an attacker looks to find correlations in the power/current curve for a guessed part of the secret key between the power consumption and intermediate results, which have been computed for this partial key and known plaintexts or ciphertexts. The attacker thus assumes that a part of the key (e.g. one byte) has a certain value and then chooses a computation step in the crypto-algorithm whose result depends only on this part of the key as well as known plaintext data or ciphertext data. For this fixed partial key value and varying plaintext data or ciphertext data, he then computes the result of the attacked computation step. If he finds significant correlations between the computed data and the power consumption of the attacked device recorded when processing the same plaintext data or ciphertext data, the attacker then assumes that he has correctly determined the partial key value. If no significant correlations are found for this partial key value, the attacker chooses another value for the partial key. If no correlations are found for any value of the partial key, the attack on the partial key fails. If the computation step to be attacked was chosen skillfully, the partial key entering the computation is so short that the attacker can try out all possible values for the partial key. If the attacker has successfully determined a part of the key, he applies the identical technology to establish further key parts. Besides, he can also utilize the fact that some key parts were already determined successfully.

For the analog utilization of the statistical methods known from differential power analysis within the scope of the present invention, for which as mentioned hereinabove the contents of a register of the processor is treated as a function of the machine command like a power/current curve, it has surprisingly turned out that the key hidden in the white-box implementation 26b can be determined by searching for correlations between the contents of the registers and the plaintexts, for intermediate results generated while computing and/or for the generated ciphertexts. Here, in particular those intermediate results generated while computing a ciphertext are suitable that depend only on a few bits of the key.

For further details on the differential power analysis and the statistical methods employed therein for establishing a secret key, it is referred to the publication "Differential Power Analysis", Paul C. Kocher, Joshua Jaffe, Benjamin Jun, Crypto 1999.

The publication "White-Box Cryptography and an AES Implementation", S. Chow, P. Eisen, H. Johnson, P. C. van Oorschot forms the substantial basis for the white-box implementations of cryptographic algorithms known from the literature. For concealing the key in a white-box implementation of the AES algorithm, this publication recommends the employment of a plurality of lookup tables for mapping an input bit sequence on an output bit sequence. For details on this, reference is made to the stated publication.

For a commercially available white-box implementation of the AES algorithm which uses a plurality of lookup tables, the inventors have succeeded in extracting the key concealed in the white-box implementation by means of the method described hereinabove in connection with FIG. 2 using a few hundred plaintexts. In detail, the attack on the white-box implementation of the AES algorithm used here proceeds as follows. The attacker collects, for example, the register contents for 200 different plaintexts. Then he selects a position in the AES at which only few bits of the secret key have been incorporated into the result, for example the output of the first S-box lookup. As is known to the skilled person, this depends on one byte of the key and one byte of the plaintexts. Now the attacker guesses a value for this one byte of the key. With this it calculates all 200 S-box outputs for 200 plaintexts. He now checks whether at any position the register contents correlate with this S-box output. If this is the case, the attacker has presumably properly guessed the key byte correctly. If the attacker does no find a correlation, he guesses a new value for the key byte and repeats the operation. In this example the attacker must thus try out at worst all values for one byte, i.e. 256 possible combinations, which can be done with relatively little effort. As the skilled person will recognize, the effort is correspondingly greater for intermediate results which depend on more than one byte of the key.

Surprisingly it has turned out that the attack represented in FIG. 2 can be repelled or at least impeded by statistically suitably permutating the lookup tables employed in a white-box implementation, e.g. the white-box implementation 26b indicated in FIG. 1. A suitable permutation of a lookup table will here be understood as a permutation for which the individual bits of the permutated lookup table do not correlate with the bits of the original lookup table. In other words: a suitable permutation of a lookup table T will here be understood as a permutation P for which the individual bits of the permutated lookup table T'(x)=P(T(x)) do not correlate with the bits T (x) for randomly varying input x.

Figure 3:
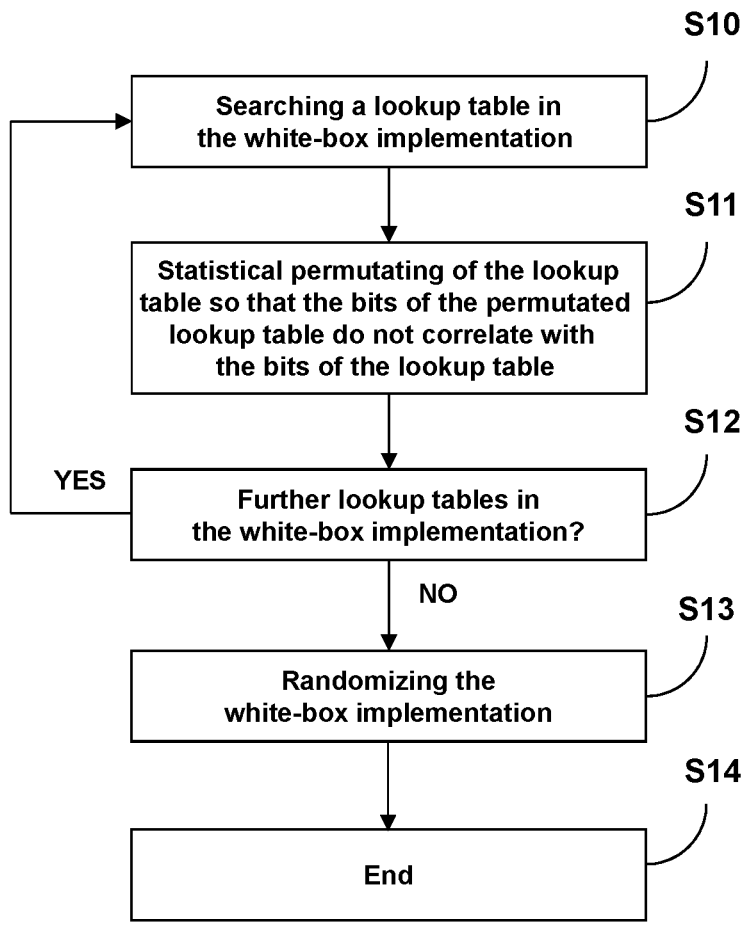

FIG. 3 shows, in the form of a flowchart, a preferred embodiment of a method for hardening the white-box implementation 26b of FIG. 1.

In a first step S10 of FIG. 3, a lookup table is found in the white-box implementation 26b.

As described hereinabove, this lookup table is statistically permutated in step S11 of FIG. 3 such that the individual bits of the permutated lookup table do not correlate substantially with the bits of the original lookup table, i.e. the lookup table T is permutated by means of a permutation P such that the individual bits of the permutated lookup table T'(x)=P(T(x)) do not correlate with the bits T(x) for randomly varying input x.

For details on statistical permutations of lookup tables of white-box implementations in general, i.e. permutations for which it is not ensured that the individual bits of the permutated lookup table do not correlate substantially with the bits of the original lookup table, reference is made to the publication "A Tutorial on White Box AES", James A. Muir, Cryptology ePrint Archive, Report 2013/104, http://eprint.iacr.org/2013/104.

As represented in step S12 of FIG. 3, the step S11 of FIG. 3 can be carried out for further, preferably all, lookup tables of the white-box implementation 26b.

After at least one lookup table of the white-box implementation 26b has been "hardened" according to the invention in step S11 of FIG. 3, further measures can be taken in a step S13 to repel or at least impede the attack represented in FIG. 2. In general these further measures according to preferred embodiments of the present invention can be considered an interspersing of chance into or the randomizing of the white-box implementation 26b. Here "randomizing" will substantially be understood to mean that for each execution of the white-box implementation 26b, an additional, varying chance is interspersed, preferably in the form of random numbers.

In detail, the following further measures can be taken according to preferred embodiments of the invention:

1. The program run of the white-box implementation 26b can randomly be scrambled. For this, the portions of the white-box implementation 26b, which can be parallelized, are executed in random order. The order is newly generated randomly for every run, i.e. for every new plaintext. As is known to the skilled person, the S-box lookup can be parallelized, for example by an implementation of the AES algorithm.

2. Code variants can be incorporated into the white-box implementation 26b, wherein the code variants provide the identical functionality in spite of different program runs. Then, when executing the white-box implementation, one of these functionally equivalent code variants can randomly be selected.

3. The white-box implementation 26b can be modified such that intermediate results, input data and/or output data are randomly masked. For this, the intermediate results, input data and/or output data are disassembled as a sum and every individual summand is random. If, for example, x is a data element to be masked and r a random number, then the data elements "x XOR r" and r can be processed instead of the data element x, wherein the operations designed for the data element x must accordingly be adapted to the work with the data elements "x XOR r" and r. More generally, the data element x can be represented as a sum (arithmetically or XOR) by several data elements xi, i=1, n. One of the many possible representations is randomly selected. The initially mentioned representation results for n=2 with x1=x XOR r and x2=r.

4. In particular in connection with asymmetric crypto-algorithms, random changes can be incorporated into the white-box implementation 26b which again fall out during the computations carried out in the implementation 26b. Preferably the blinding techniques known to the skilled person can be employed for this purpose, as are described, for example, in Section 3.4.1.1 of the document "BSI: Minimum Requirements for Evaluating Side-Channel Attack Resistance of RSA, DSA and Diffie-Hellman Key Exchange Implementations", Part of AIS46, https://www.b-s.bund.de/SharedDocs/Downloads/DE/BSI/Zertifizierung/Iinterpretationen/
AIS_46_BSI_guidelines_SCA_RSA_V1_0_e_pdf.pdf.

5. In the white-box implementation 26b tabulated functions can be randomized. For cryptographic algorithms which run on a processor, functions are frequently stored in memory in form of tables, for example, the S-boxes with the AES or DES algorithm. If, for example, T is a function which is deposited in the white-box implementation 26b in the form of the values T(0), T(1), T(2), . . . , the white-box implementation 26b can be hardened by depositing instead, for example, the values T'(k)=u XOR T(k XOR v), wherein the random numbers u and v are newly chosen with every run of the hardened white-box implementation 26b.

6. The lookup tables used in the white-box implementation 26b can be replaced respectively by several functionally equivalent variants of lookup tables. These variants of lookup tables are preferably hardened according to the hereinabove described step S11 as represented in FIG. 3, i.e. statistically permutated such that the individual bits of the permutated lookup table substantially do not correlate with the bits of the original lookup table. When carrying out the white-box implementation, respectively one of the functionally equivalent variants of the lookup tables can randomly be selected.

Although it is preferred that the hereinabove described measures from 1 to 6 are employed for randomizing the white-box implementation 26b in connection with the statistical permutating of lookup tables of the white-box implementation 26b represented in FIG. 3 and described hereinabove, the skilled person will recognize that these measures can in principle also be employed independently for the purpose of repelling or at least impeding the attack on the white-box implementation as represented in FIG. 2.

LIST OF REFERENCE SIGNS

10 Communication system
20 Mobile end device
22 Chip
24 Processor
26 Memory unit
26a Software application
26b White-box implementation of a crypto-algorithm
30 Arithmetic unit
32 ALU
34, 36, 38 Registers R0, R1 and R2
40 Control unit
42 Program counter PC
44 Command register IR
46 Status register SR
48 Stack register or stack pointer SP
50 Communication channel
60 Server or terminal

The invention claimed is:

1. A method for testing a white-box implementation of a cryptographic algorithm, said implementation being executable on a processor, generating a ciphertext from a plaintext by means of a secret key and being present in the processor in the form of machine commands, wherein the processor comprises at least one register and the method comprises the following steps:
   (a) feeding one plaintext of a plurality of plaintexts to the white-box implementation;
   (b) reading out and storing the content of the at least one register of the processor stepwise while processing the machine commands of the white-box implementation stepwise, wherein intermediate results are generated while processing the machine commands of the white-box implementation stepwise for generating the ciphertext from the plaintext;
   (c) repeating the hereinabove steps (a) and (b) with a further plaintext of the plurality of plaintexts N-times; and
   (d) statistically evaluating a contents of the registers and the plaintexts, the intermediate results and/or the ciphertexts generated from the plaintexts by searching for correlations between the contents of the registers and the plaintexts, the intermediate results and/or the ciphertexts generated from the plaintexts to establish the secret key;
   wherein N is chosen so large that a static evaluating of the contents of the registers and the plaintexts, the intermediate results and/or the ciphertexts generated from the plaintexts is possible.

2. The method according to claim 1, wherein
   the content of a register for a plaintext is treated as a function of the number of the processed machine commands analogously to a power/current curve in the differential power analysis; or/and
   the step (d) of statistically evaluating the contents of the registers and the plaintexts, the intermediate results and/or the ciphertexts generated from the plaintexts comprises the step of evaluating by means of statistical methods which are known from differential power analysis.

3. The method according to claim 1, wherein the white-box implementation is part of a software application for carrying out a digital transaction.

4. The method according to claim 1, wherein the steps (a) and (b) are carried out with at least 10, 100 or 1000 different plaintexts.

5. The method according to claim 1, wherein in the step (b) the readout of the content of the at least one register is carried out only as of a machine command predefined in the white-box implementation and further in the step (b) the readout of the content of the at least one register is carried out as of the predefined machine command for a predefined number M of machine commands.

6. The method according to claim 1, wherein the white-box implementation of a cryptographic algorithm is a white-box implementation of the AES algorithm.

7. The method according to claim 1, wherein in the step (d) of statistically evaluating the contents of the registers and the plaintexts, the intermediate results and/or the ciphertexts generated from the plaintexts those intermediate results and/or ciphertexts generated from the plaintexts are employed for the statistical analysis that depend on only as few bits of the secret key as possible.

* * * * *